United States Patent [19]

Koslowski

[11] Patent Number: 5,015,449

[45] Date of Patent: * May 14, 1991

[54] PROCESS FOR MAKING CONSTRUCTION GRADE CALCIUM SULFATE ALPHA-HEMIHYDRATE FROM MOIST FINELY DIVIDED GYPSUM OBTAINED FROM A POWER PLANT FLUE GAS DESULFURIZATION

[75] Inventor: Thomas J. Koslowski, Aachen, Fed. Rep. of Germany

[73] Assignees: Promineral Gesellschaft zur Verwendung von Mineralstoffen mbH, Essen; Sicowa Verfahrenstechnik fur Baustoffe GmbH & Co. K.G., Aachen, both of Fed. Rep. of Germany

[*] Notice: The portion of the term of this patent subsequent to May 14, 2008 has been disclaimed.

[21] Appl. No.: 197,604

[22] Filed: May 23, 1988

[30] Foreign Application Priority Data

May 22, 1987 [DE] Fed. Rep. of Germany ....... 3717187

[51] Int. Cl.⁵ ..................... C04B 11/02; C04B 11/024
[52] U.S. Cl. ..................................... 423/172; 156/43; 264/333; 423/170; 423/171; 106/772
[58] Field of Search ....................... 423/172, 171, 170; 264/333; 156/43; 106/774, 772

[56] References Cited

U.S. PATENT DOCUMENTS

| 1,901,051 | 3/1933 | Randel et al. | 423/172 |
| 3,410,655 | 11/1968 | Ruter | 423/170 |
| 4,309,391 | 1/1982 | O'Neill | 423/172 |
| 4,540,555 | 9/1985 | Franke et al. | 423/555 |
| 4,604,141 | 8/1986 | Natori et al. | 106/115 |

FOREIGN PATENT DOCUMENTS

| 2049028 | 4/1971 | Fed. Rep. of Germany. |
| 3117662 | 11/1982 | Fed. Rep. of Germany. |
| 3502637 | 9/1986 | Fed. Rep. of Germany. |
| 47-20460 | 10/1972 | Japan | 423/170 |
| 829652 | 3/1960 | United Kingdom | 423/172 |

OTHER PUBLICATIONS

Browning, *Chemical Engineering*, Dec. 4, 1967, pp. 147-170.
Ullmanns Encyklopadie der Technischen Chemie, Fungizide bis Holzwerkstoffe, Verlag Chemie, Weinheim-New York, 1976, Band 12, pp. 301, 303, 304.
Baugipse, DIN 1168-Teil 1, Jan. 1986, Preisgr. 4, pp. 1-3, Normenausschuss Bauwesen (NABau) im DIN Deutsches Institut für Normung e. V.
Baugipse, DIN 1168-Teil 2, Jul. 1975, Preisgr. 6, Fachnormenausschuss Bauwesen (FNBau) im Deutschen Normenausschuss (DNA).

*Primary Examiner*—Gary P. Straub
*Assistant Examiner*—Stephen G. Kalinchail
*Attorney, Agent, or Firm*—Herbert Dubno

[57] ABSTRACT

The process makes calcium sulfate alpha-hemihydrate or essentially plaster of paris from finely divided gypsum made by desulfurizing flue gas obtain from a power plant fired by brown coal by transforming the calcium sulfate dihydrate in the presence of saturated steam. A molded body is formed from the calcium sulfate dihydrate which has a plurality of pores. The pore volume amounts to 15 to 60% by volume of the total volume of the entire molded body. More than 5% by volume of the pore volume contains air. The molded body is fed to an autoclave. In the presence of a sufficient water quantity in the pores, the crystal habit and the crystal growth of the calcium sulfate alpha-hemihydrate crystals which grow in an aqueous solution phase are controlled by a process temperature in the range between 110° to 180° C. by the pressure of the treatment atmosphere in the autoclave. The molded body is removed from the autoclave after recrystallization transformation and delivered for use. Key products of this process and their derivatives are also described.

11 Claims, 6 Drawing Sheets

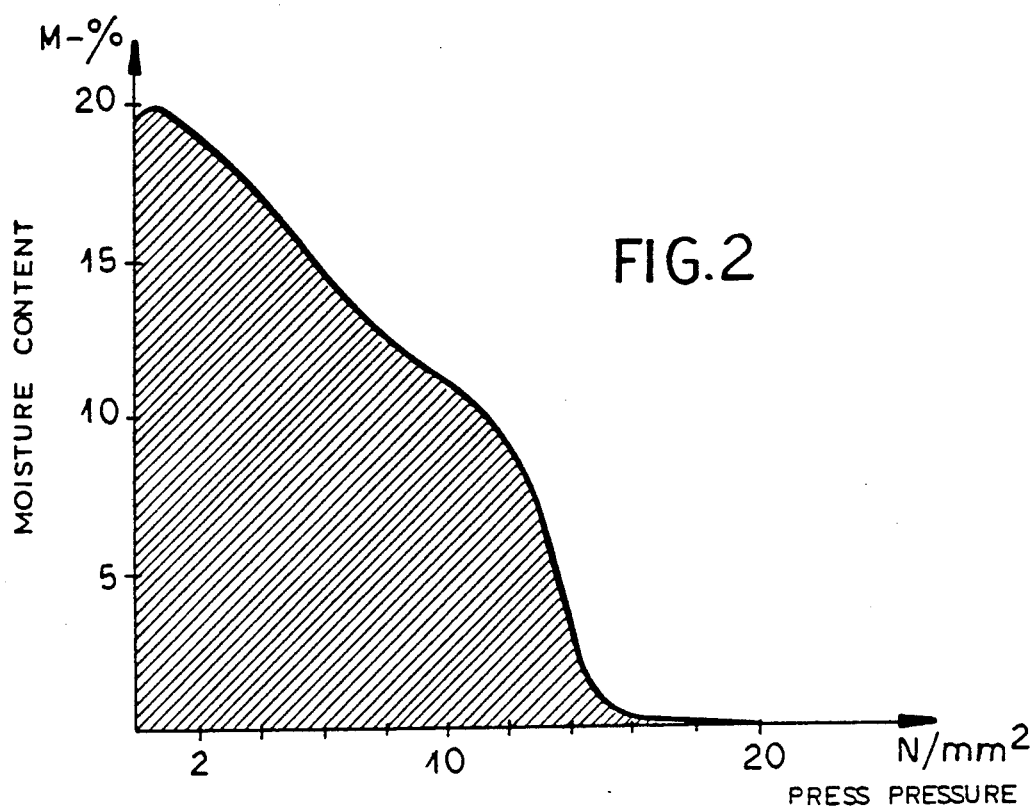
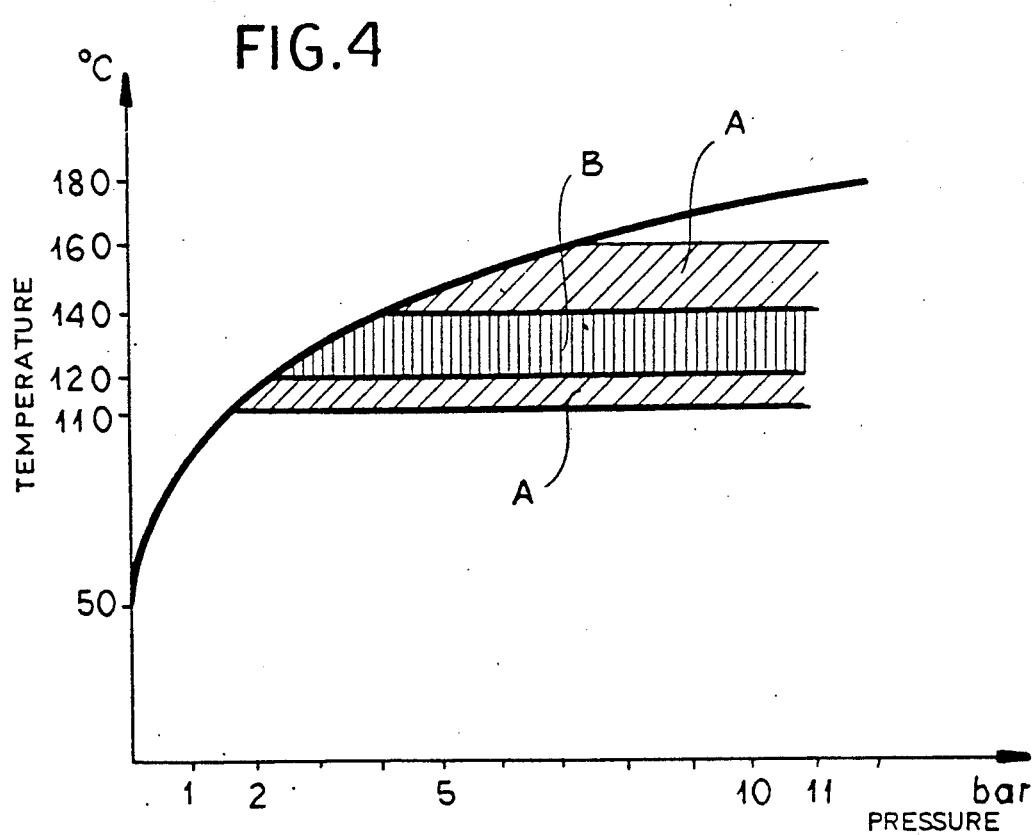

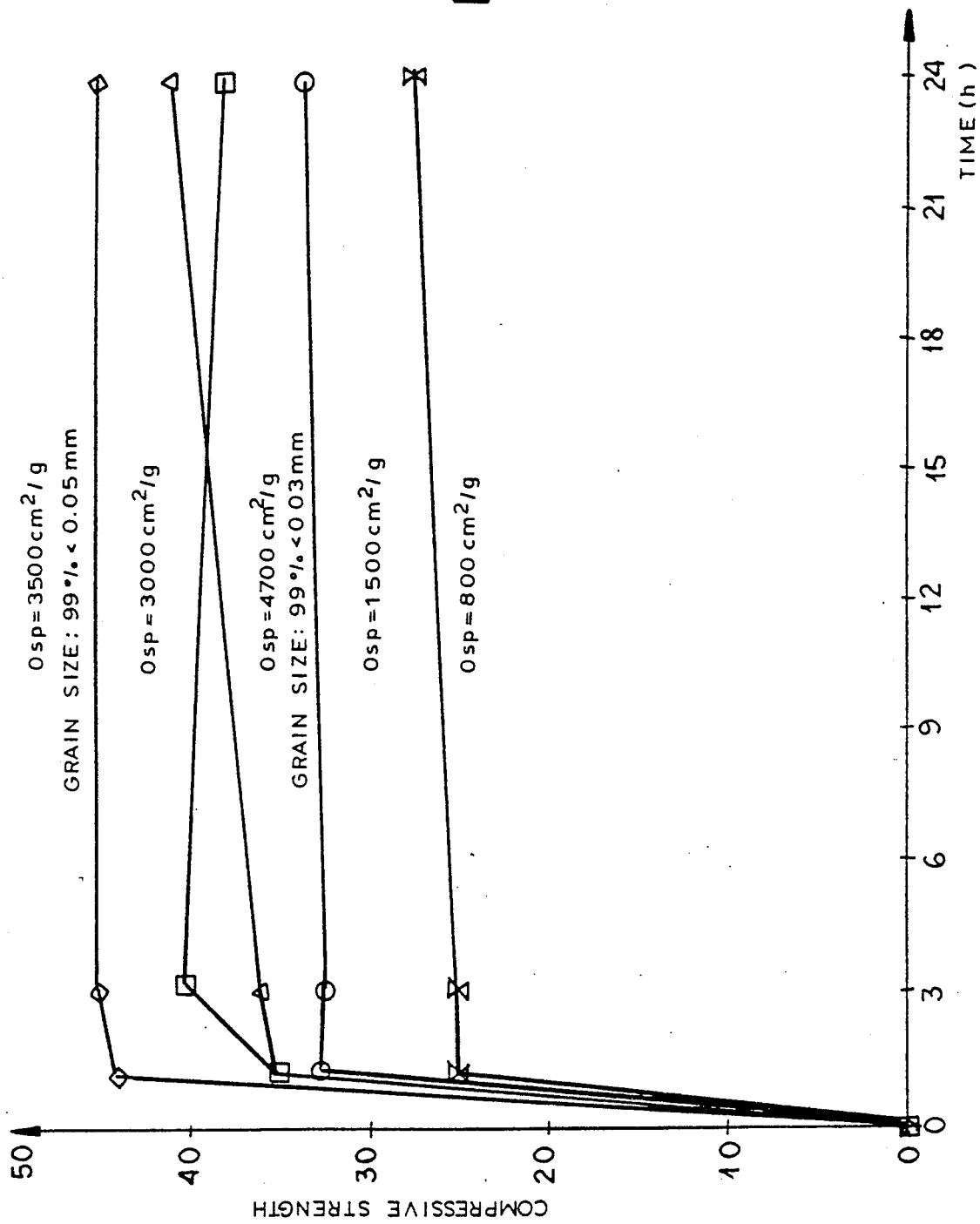

PROCESS FOR MAKING CONSTRUCTION GRADE CALCIUM SULFATE ALPHA-HEMIHYDRATE FROM MOIST FINELY DIVIDED GYPSUM OBTAINED FROM A POWER PLANT FLUE GAS DESULFURIZATION

CROSS REFERENCE TO RELATED APPLICATION

This application is related to my commonly owned copending application Ser. No. 07/197,442 filed 23 May 1988.

FIELD OF THE INVENTION

My present invention relates to a process for making plaster of paris from gypsum obtained from power plant flue gas desulfurization processes and, more particularly, to a process for making plaster of paris or calcium sulfate alpha-hemihydrate from gypsum obtained from a flue gas desulfurization unit. It also relates to the products of this process.

BACKGROUND OF THE INVENTION

A process is known for making calcium sulfate alpha-hemihydrate suitable for a construction material from a moist finely divided gypsum obtained by desulfurization of flue gas from a power plant fired by brown coal or lignite, especially from a gypsum obtained by flue gas desulfurization from a wet flue gas desulfurization unit. This process proceeds by recrystallization transformation of the calcium sulfate dihydrate contained in the gypsum in the presence of saturated steam.

Different processes are known for transforming calcium sulfate dihydrate into calcium sulfate alpha-hemihydrate. My invention is based on a process for making calcium sulfate alpha-hemihydrate from natural gypsum described in Ullmanns Encyklokädie der technischen Chemie, Bd. 12, 1976, Seite 301 (Ullmans Encyclopedia of Industrial Chemistry, 12, 301(1976)).

In this process, calcium sulfate dihydrate pieces, namely naturally occurring gypsum pieces, are fed to an autoclave and are converted to calcium sulfate alpha-hemihydrate pieces in the autoclave in the presence of saturated steam at a temperature of 130° to 135° C.

This alpha-hemihydrate product is dried above the thermal stability limit temperature of calcium sulfate dihydrate and is ground up for further use.

More specifically, the gypsum removed from a natural deposit is broken up into a grain size of 150 to 300 mm, is filled into baskets and is fed to an autoclave in the baskets.

The autoclave is directly or indirectly heated with steam from 130° to 135° C. The heating is controlled so that a pressure of 4 to 5 bar builds up in about four hours according to a saturated steam curve. Then the autoclave is emptied.

The alpha-hemihydrate gypsum is introduced into a drying chamber in the baskets and dried under standard pressure at about 105° C. and subsequently fine ground.

In the surface regions of the pieces of material one finds well-defined calcium sulfate alpha-hemihydrate crystals which grow in a more or less needle shape.

In the core of the pieces of material after autoclaving structures with a diffuse crystal pattern and also residual calcium sulfate dihydrate are found even after very long treatment times. The crystal portion and also the surface fine structure are not controllable with the steps of this known process. Crystal portion means the grain size and structure of the surface of the crystal. The surface fine structure refers to the topography of the surfaces of the crystal. The quality needs improvement because of these reasons.

With so-called chemical gypsum, as formed in a finely divided state for example in phosphoric acid manufacture, it is known to mix the chemical gypsum with water to form a suspension or slurry and to deliver it to a flotation unit for removal of organic impurities.

Subsequently, both the water soluble and insoluble impurities are separated by a counterflow wash in a scrubber tower or in a hydrocyclone. Then the gypsum/water slurry is pumped continuously into an autoclave and transformed by recrystallization at a temperature of about 150° C. and an appropriate saturated steam pressure into calcium sulfate alpha-hemihydrate.

Additives for control of the pH-value and for changing the crystal pattern can be metered into the autoclave and a product alpha-hemihydrate with various properties is obtainable.

In this known process, however, the expensive purification steps are troublesome and the large quantities of water required for crystallization lead to problems in drying and separation. Here distinct calcium sulfate alpha-hemihydrate crystals arise more by chance and control of the process in regard to crystal pattern and surface fine structure of the crystals formed is not provided. By contrast, manufacture of calcium sulfate alpha-hemihydrate with a special and well defined crystal pattern and also a well defined surface fine structure leads to a product with special properties for a variety of applications in the construction industry.

OBJECTS OF THE INVENTION

It is an object of my invention to provide an improved process for making plaster of paris or calcium sulfate alpha-hemihydrate from gypsum, especially gypsum obtained from power plant flue gas desulfurization, which does not have the above mentioned disadvantages and/or difficulties.

It is also an object of my invention to provide an improved process for making plaster of paris or calcium sulfate alpha-hemihydrate from gypsum, especially gypsum obtained from power plant flue gas desulfurization in connection with a power plant using brown coal, which leads to a product which practically completely and homogeneously comprises calcium sulfate alpha-hemihydrate crystals.

It is another object of my invention to provide an improved process for making plaster of paris or calcium sulfate alpha-hemihydrate from gypsum, especially gypsum obtained by power plant flue gas desulfurization in connection with a power plant using brown coal, which can be controlled to produce a product having a reproducible and predetermined crystal pattern and surface fine structure.

It is a further object of my invention to provide an improved plaster of paris or calcium sulfate alphhemihydrate product having a predetermined crystal pattern and surface fine structure as well as a very homogeneous chemical composition.

SUMMARY OF THE INVENTION

These objects and others which will become more readily apparent hereinafter are attained in accordance with my invention in a process for making calcium sulfate alpha-hemihydrate suitable for use as a construction material from a moist fine grained gypsum obtained by desulfurization of flue gas from a power plant fired by brown coal, especially from flue gas desulfurizing gypsum from a wet flue gas desulfurization unit, by recrystallization transformation of the calcium sulfate dihydrate contained in the flue gas desulfurized gypsum in the presence of saturated steam.

According to my invention a molded body is formed from the gypsum made by desulfurizing flue gas whose total volume is 15 to 60% by volume pore volume and more than 5% by volume of the pore volume contains air and whose total mass is at least 3% by weight water (all percentages being related to the total volume of an individual molded body when a volume percent is given and/or the total mass of the individual molded body when a weight percent is given).

The molded body is fed to an autoclave. The crystal growth and the crystal pattern of the calcium sulfate alpha-hemihydrate which grows from an aqueous solution phase is regulated by control of a process temperature in the range between 110° C. and 180° C. and by the pressure of the process atmosphere in the autoclave.

The molded body is removed from the autoclave and delivered for use after the recrystallization transformation. Further the molded body may be dried, usually first by heating above the thermal stability limit of the calcium sulfate dihydrate before being delivered for use. The latter product can be ground up and additionally processed, e.g. by sifting or size gradings. The drying is generally continued until the product has less than 1% moisture by weight.

The process according to my invention produces a fully, very homogeneous calcium sulfate alpha-hemihydrate in the form of very uniform crystals with a controllable crystal pattern.

If the process of my invention is not used, the molded body is destroyed by crack formation and fracturing during the autoclaving process.

That is surprising because in the currently described processes for making the alpha-hemihydrate from natural gypsum a structure arises with a diffuse crystal pattern in the core of the individual pieces of the gypsum stone and the recrystallization transformation does not occur satisfactorily.

Apparently the effect of my invention arises from the fact that water and sufficient space because of available pore volume is present for mass transport during the recrystallization transformation in the pore volume before the start of the recrystallization transformation, which occurs from the solution phase. The molded body has a large capillary volume as a result of the pore volume which has a positive effect. The saturated steam condenses in the autoclave on the cold molded body brought to the ambient temperature which completely draws the hot condensed water in like a sponge.

In this way the heat enters until it penetrates to the interior of the molded body. The pore volume may be adjusted without much difficulty during the making of the molded body, whether or not the molded body is shaped like a pellet or is pressed into a molded body, e.g. a brick or block.

Surprisingly additives influencing the growth of crystallization are not usually required in the process according to my invention.

That is because the gypsum made by desulfurizing flue gas from a power plant fired with brown coal, especially the gypsum made by desulfurizing flue gas in a wet flue gas desulfurization unit, brings along suitable substances. When the desired accompanying substances and the quantity of such substances do not correspond to those generated in combustion of the brown coal used or are otherwise not brought along in the flue gas in sufficient quantity, growth influencing additives can be admixed with the desulfurizing gypsum in the scope of my invention since they are already known.

According to my invention for the aforementioned purpose there are admixed finely divided brown coal and/or equally effective wood containing materials. Grain size of the crystals can in particular be controlled with the growth controlling additives. While one would suppose, based on experience with the recrystallization transformation of chemical gypsum into calcium sulfate alpha-hemihydrate, that the impurities accompanying the flue gas desulfurized gypsum must be removed, it is surprising that this is not required with my invention.

To utilize the gypsum made by desulfurizing flue gas in commercial construction as is already described in German Patent document No. 35 02 637, the gypsum made by desulfurizing flue gas can be formed into pieces and the pieces can be calcined with or without pressure by saturated or superheated steam without an autoclave. Special parameters for recrystallization transformation to a well defined crystal structure are not part of the requirements. This known process can not make calcium sulfate alpha-hemihydrate with a well defined crystal pattern and control the crystal pattern. Similar difficulties are associated with another known process (see German Patent document No. 31 17 662) which is based on gypsum made by desulfurizing flue gas and with which wall building blocks are formed, primarily with the addition of sand.

Several other structures and forms are possible within the scope of my invention. Thus, one works approximately with molded blocks which have 20 to 50% by volume pore volume. Especially good results are obtained when molded bodies are formed which have 25 to 35% pore volume. A special principle of my invention which has proven very advantageous is that the a molded body should have at least half of the pore volume filled with air.

In the scope of my invention the molded body is formed advantageously by pressing; however, that is not the only way one can form this body. The molded product is of course a stable shaped molded stone. Thus one can work with presses which are similar to the known lime sand stone presses. Moreover my invention teaches that the gypsum made by desulfurizing flue gas is formed by pressing to a molded body and indeed according to the content of physically bound water in the range of 3 to 20 weight percent in the gypsum made by desulfurizing flue gas to a rigid molded body by autoclaving with a press pressure of up to 14 N/mm$^2$.

The less the water content in the gypsum made by desulfurizing flue gas, the higher is the requisite press pressure and vice versa, understandably considering the pore volume.

Surprisingly the product molded body has on the one hand the pore volume essential for my invention with the appropriate water content and on the other hand is rigid under autoclaving. If one works with shaped bricks they can be stacked in the autoclave with open slots or joints which is advantageous for the controlled crystal recrystallization transformation.

For making needlelike calcium sulfate alpha-hemihydrate crystals with higher reaction speed, according to my invention, it is especially advantageous to work primarily with a process temperature of over 140° C.

For the purpose of making compact prismatic columnar calcium sulfate alpha-hemihydrate crystals, one can work primarily with a treatment temperature in the range from 120° to 140° C. This means chiefly that one can work in a short time interval with other temperatures during the crystal recrystallization transformation and particularly the treatment can occur at other temperatures up to the crystal recrystallization transformation.

If one works with a processing temperature above 140° C. to 160° one obtains an increasing proportion of smaller and heavier crystals of needlelike calcium sulfate anhydrite crystals with increasing process temperatures. With temperatures above 160° C. one obtains a growing proportion of anhydrite fragments with longer residence time.

One can continuously influence the crystal form by the pressure at all temperatures using the process according to my invention. For making heavier compact calcium sulfate alpha-hemihydrate crystals of this crystal pattern, pressure in the autoclave is increased and a gas is forced into the autoclave.

One can work with a constant pressure in this special recrystallization transformation, although this too can be changed during the treatment. After the recrystallization transformation the water present in the pore space of the molded body can be at least partially forced out by controlled relief of the pressure in the autoclave.

The molded body can be made so that it is not destroyed on treatment in the autoclave. That is the case with gypsum made by desulfurizing flue gas made from a wet flue gas desulfurization unit by power plants fired with Rhine brown coal without additional steps. Within the scope of my invention a binding agent is mixed in with the gypsum made by desulfurizing flue gas required before making the molded body. One suitable binding agent is particularly a fine grained calcium sulfate alpha-hemihydrate which for example can be added in an amount up to 5% by weight. To adjust the pore volume the gypsum made by desulfurizing flue gas can in part be replaced by a suitable foam as is also known for making lightweight building material.

My invention also provides a composition of matter comprising the calcium sulfate alpha-hemihydrate made by the above processes. This composition of matter is characterized by a particular crystal pattern and surface fine structure as well as an exceptionally uniform chemical composition.

The plaster of paris according to my invention can be used in a variety of compositions of matter. A binding agent can be incorporated for the immediate and rapid setting building material. This material can be used for underground construction including tunnel and gallery digging and for support in subterranean operations. Other examples include a self-leveling floor plaster, a rapid repair paste for rapid setting of a concrete and/or asphalt roof, a fiber and/or chip reinforced plate product, a porous foamlike gypsum interwall plate, a calcium silicate product having a porous foamlike light gypsum flux additive, a porous foamlike adsorbent for use as an oil binder, solvent binder or animal litter and a material for making molds for ceramic purposes.

BRIEF DESCRIPTION OF THE DRAWING

The above and other objects, features and advantages of my invention will become more readily apparent from the following description, reference being made to the accompanying highly diagrammatic drawing in which:

FIG. 2 is a graphical illustration of the dependence of the supplied moisture content of the calcium sulfate dihydrate on pressure in regard to making rigid, stable and autoclavable molded bodies;

FIG. 4 is a graphical illustration of the dependence of the stability range for the alpha-hemihydrate on temperature and pressure;

FIG. 7 is a graphical illustration showing the dependence of the compression strength of pastes which were made from the calcium sulfate alpha-hemihydrate according to my invention on the grain fineness.

SPECIFIC DESCRIPTION

Figure 1:
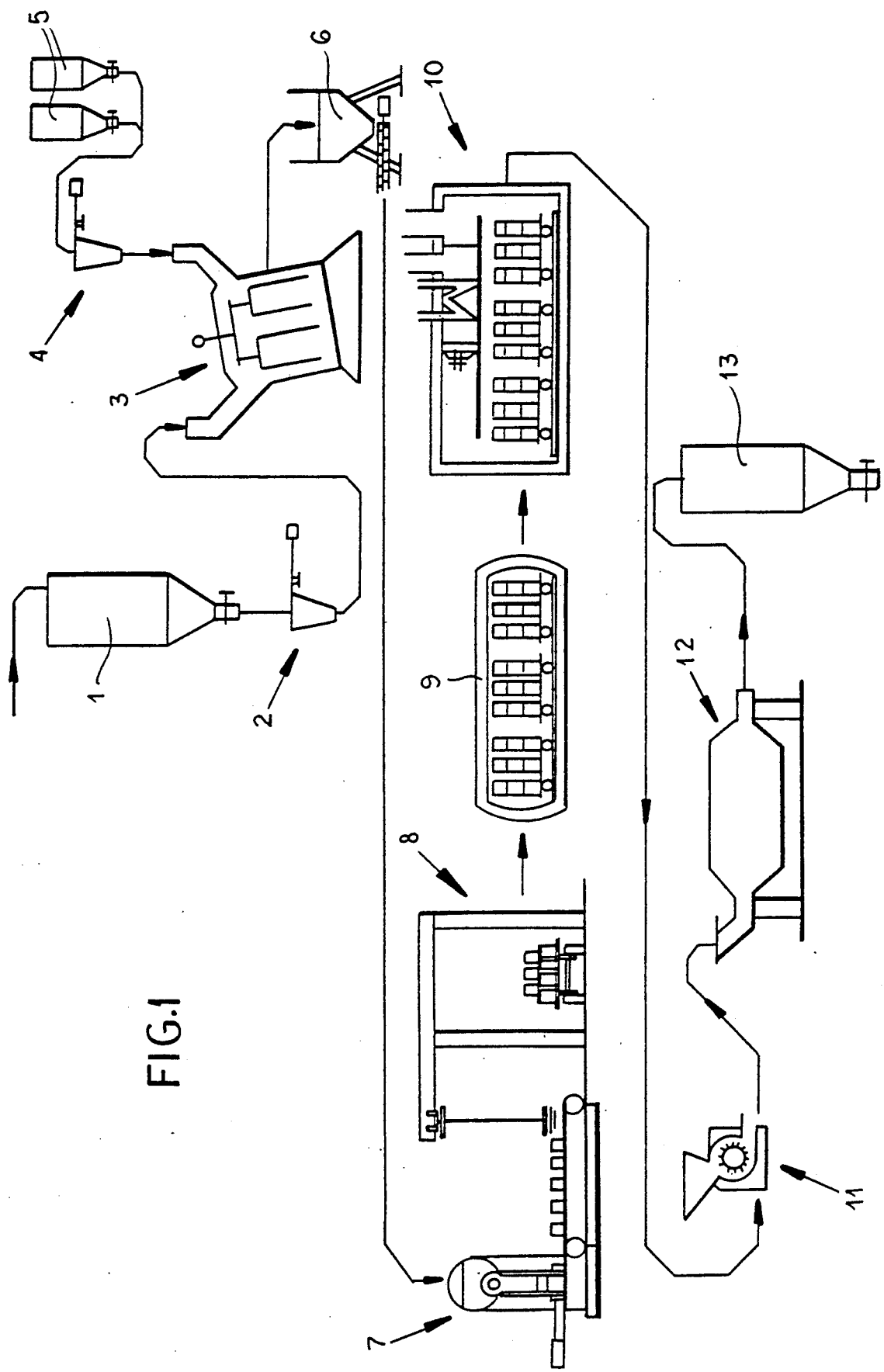
FIG. 1 is a schematic view in flow-diagram form of a plant for performing the process according to my invention.

The plant shown in FIG. 1 comprises a supply silo 1 which receives calcium sulfate dihydrate in the form of gypsum made by flue gas desulfurization.

The calcium dihydrate is fed from the supply silo 1 by a metering device 2 to a mixing device 3 which is also combined with another metering device 4 for delivery of an additive 5 if required. The calcium sulfate dihydrate from the mixing device 3 reaches an intermediate container 6 from which it is fed to a forming device 7.

The forming device 7 can comprise a pressing machine for making substantially rectangular products (blocks or bricks), an extrusion device with a downstream cutting device for the extrudate coming from the extruding device, a granulating machine, as is used in the making of pellets or also a casting mold with vibratory or shaking compression and/or chemical fixing.

The calcium sulfate dihydrate is molded or formed in the forming device into rigid, stable and autoclavable molded bodies which have a total pore volume of from 15 to 60% by volume. The total pore volume comprises an air pore volume of at least 5% by volume and, when the starting material is wet, the remaining balance of the pores are filled with water.

The product, i.e. the molded or formed bodies, substantially shaped as briquettes, parallelepiped blocks or pellets, in suitable baskets are positioned by a stacking device 8 on a movable carriage so that as large a free accessible surface as possible remains.

The molded or formed bodies or blocks so stacked are guided into an autoclave 9 and load by load are autoclaved in saturated steam at a temperature of between 110° C. and 180° C. until they are practically completely transformed into calcium sulfate alpha-hemihydrate crystals. If necessary a suitable pressure lock or gate can be provided for the carriage carrying the formed or molded bodies to and fro in the autoclave 9.

The autoclaved molded or formed bodies are dried subsequently in a drying unit 10 to balance the moisture content, e.g. to a 1% moisture content. The bodies are then broken up in a crushing or breaking unit 11 and subsequently are ground to the desired grain size for the particular application in a grinding unit 12.

From the time it leaves the autoclave 9 until the time it leaves the grinding unit 12 and enters a silo 13, the calcium sulfate alpha-hemihydrate is kept above the thermal stability limit, i.e. over about 45° C., to avoid reforming calcium sulfate dihydrate. For crushing, a hammer mill can be used. The drying unit 10 can also follow the crushing unit 11 and can be also an air-flow drier in which the product is entrained in an air stream. If necessary, drying and grinding can be performed in the same step. The grinding unit 12 can be a disintegrator, a ball mill or a pin disk mill with subsequent sifting-type classifier.

FIG. 2 shows the range of moisture content of the calcium sulfate dihydrate (shaded region) tolerable in the manufacture of the molded body as a function of the applied pressure; the moisture content in % is plotted along the ordinate while the pressure in $N/mm^2$ is plotted along the abscissa. These molded bodies made by pressing are rigid, stackable and are crack-free in subsequent autoclaving. The supplied calcium sulfate dihydrate, which for example originates from a wet desulfurizing unit, is compressed to a molded body with appropriately supplied moisture. The moisture content is between 5 and 20% by weight. If because of a variety of reasons the moisture content exceeds about 20% by weight, a predrying can be performed to operate in the shaded region of FIG. 2. For, pressing a pressure between 0.1 to 14 $N/mm^2$ should be used. Advantageously the pressure should be between 1 to 5 $N/mm^2$, especially 2 to 3 $N/mm^2$.

If one works in the right hand portion of FIG. 2 outside the shaded region in the graph, one of course obtains molded or formed bodies but they are not autoclavable without forming fractures or cracks and are destroyed during autoclaving. Still further in the right hand portion of the graph of FIG. 2 with constant moisture content but increasing pressure the molded or formed body sticks to the molding tool of the press. The pressure is thus adjusted so that the molded bodies parameters remain in the shaded region of FIG. 2. Basically a high starting moisture content increases the fracture or crack tendency in autoclaving, while a lower pressure reduces the tendency to crack the molded body during autoclaving.

Instead of predrying with more than about 20% by weight starting moisture content in the calcium sulfate dihydrate and/or for improvement of the stability and stackability of the manufactured molded body, a chemical strengthening agent can be fed by the metering device 4, especially until it is present in an amount up to 5% by weight of the calcium sulfate alpha-hemihydrate which could be made by the process. Alternatively also calcium sulfate beta-hemihydrate or another nonalkali fixing agent could be used. This is especially important during use of a casting mold as a molding device. The mixing of these kind of substances is problemfree because of the fine grained consistency of the starting material.

Figure 3:
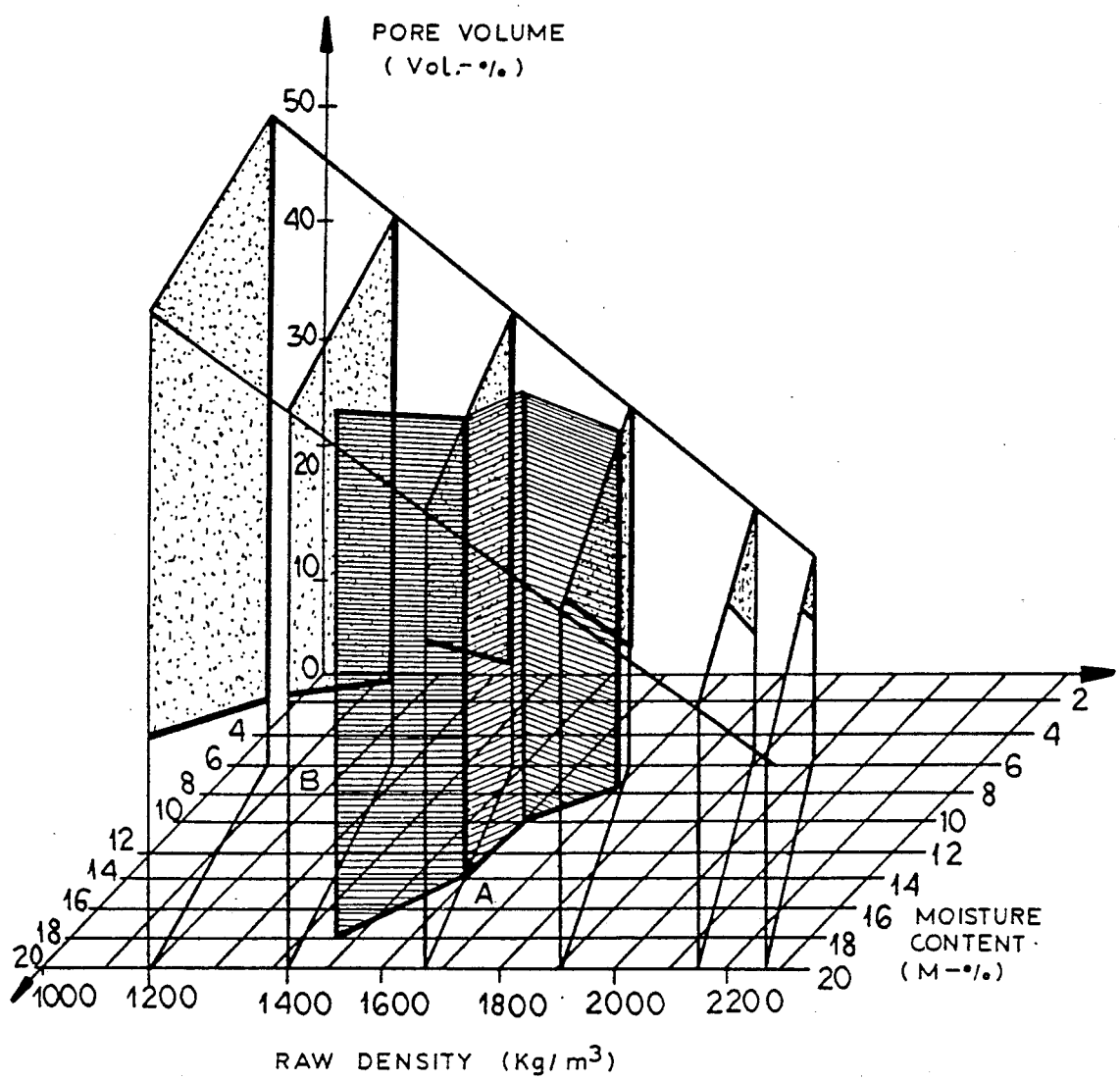
FIG. 3 is a graphical illustration of a three dimensional representation of the dependence of the total pore volume of the calcium sulfate dihydrate molded body on the molded body raw or crude density and the molded body moisture content combined from air-filled regions (shown with dotted areas) and water-filled regions (shown with clear or undotted areas) with a dividing surface indicating the boundary for fracture-free autoclaving.

If other molding processes are used than those customarily used in molding engineering with limestone and lime sandstone, the molded body rough density and the mold body moisture content can be used as characteristic variables equivalent to and instead of the pressure as is indicated in FIG. 3.

As required by the pure gypsum density (=2.315 $g/cm^2$), the molded body rough density and the moisture content in the molded body adjust themselves to pores containing a well defined amount of air and if necessary water. In FIG. 3 the clear areas indicate the water pore volume, the dotted areas the air pore volume. The hatched shaded area is the dividing surface which separates those molded bodies which can be autoclaved crackfree or fracturefree (rear region B) from those which cannot be so autoclaved (front region A). The molded bodies are essentially autoclavable when the air pore volume is greater than the water pore volume. The total pore volume required for the crack free autoclaving and its composition is as is determined from FIG. 3.

FIG. 4 shows the steam pressure curve for water in a pressure/temperature diagram which indicates the functional relationship between pressure and temperature in an autoclave operating with saturated steam.

Further FIG. 4 shows the stability area (A+B) and the preferred synthesis area B for the calcium sulfate alpha-hemihydrate made according to this process. This can be made in a temperature range between 110° C. and 160° C. Temporary temperatures up to 180° C. are permitted and the synthesis pressure in the autoclave indicated clearly through the pressurized gas feeder can be clearly increased relative to the saturation pressure present at this temperature.

To make calcium sulfate alpha-hemihydrate with a good crystal pattern, i.e. large, compact individual crystals (primary grain size), advantageously in prismatic form with average grain size (prism size) between 120° C. and 140° C. The calcium sulfate alpha-hemihydrate has a many faceted crystal surface with a very large primary grain size (prism length). This improves the reactivity and thus the workability, the rigidity and the solidification inside a short time with mortars and pastes which are made using a calcium sulfate alpha-hemihydrate.

Making calcium sulfate alpha-hemihydrate with a higher synthesis pressure, i.e. in the region to the right of the steam pressure curve in FIG. 4, leads to a still more compact individual crystal with a smaller specific surface area. This gives advantages for the manufacture of plasters and pastes for applications which above all are characterized by reduced water requirements, good processing and high solidity.

Working in the region B leads to a very regular crystal pattern in which the crystal surfaces are controlled by increasing the process pressure above that of the saturated steam by feeding in a gas at a suitable pressure. The resulting surfaces are smoother. With increased temperature between 140° C. and 160° C. an increased recrystallization transformation rate, i.e. shorter autoclaving time, results in an increasing needle-forming pattern of the calcium sulfate alpha-hemihydrate crystals with increasing proportions of smaller and stronger needle-shape calcium sulfate anhydrite crystals.

In working at temperatures from 120° C. gradually downward toward 110° C. the prismatic character of the crystals decreases and the crystal pattern as such is uncontrollable but is nevertheless homogeneous.

The crystallization agents and/or crystal growth inhibitors as well as the corrosion inhibitors if necessary provided to the calcium sulfate dihydrate before making the molded body influence on the one hand the crystal pattern and the surface fine structure and on the other hand the technological properties of the final products made from the calcium sulfate alpha-hemihydrate. These final products are influenced by the grinding up of the calcium sulfate alpha-hemihydrate which occurs according to the provided purpose.

Figure 5:
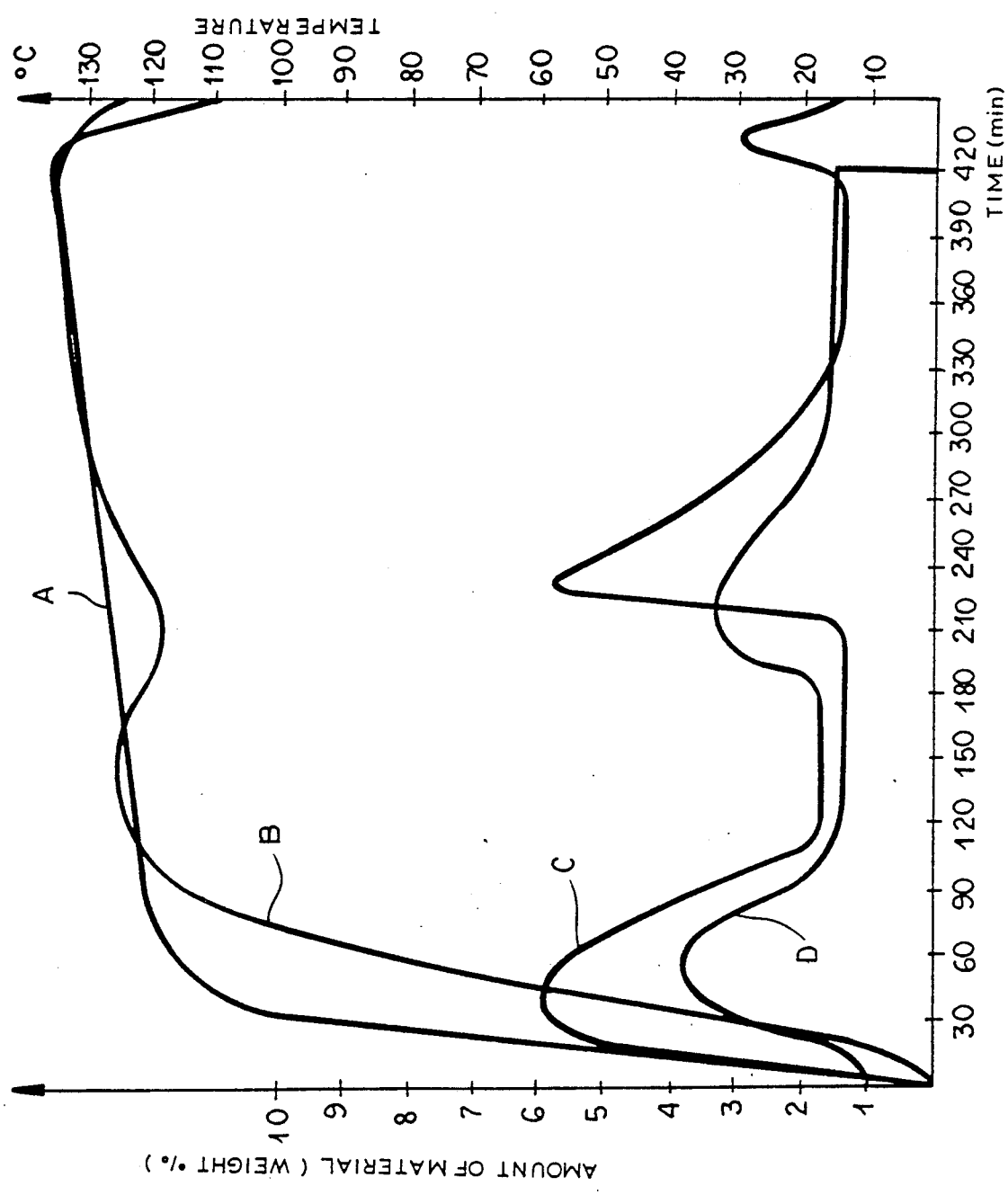
FIG. 5 is a graphical illustration showing the time course of different important parameters of the autoclaving process.

FIG. 5 shows the time course of the autoclave inner wall temperature (curve A), the temperature on the interior of a molded body of a size of 20 cm ×20 cm ×9.5 cm (curve B) and the time course of the steam required (curve C) and the yield in the condensate in the autoclave condensation (curve D). As seen from the course of the curves A and B the temperature on the inside of the molded body follows the autoclave interior wall temperature with only a slight time delay.

The temperature decrease inside the molded body after attaining the provided autoclave temperature is required by the endothermic recrystallization transformation reaction and is subsequently balanced by the additional steam feed.

The curve C represents the time course of the steam quantity required during autoclaving. Apparently a larger steam requirement exists for heating the filled autoclave. After that the steam requirement drops to a lower value for balancing the loss.

Subsequently newly generated steam is required for balancing the temperature decrease as a result of the endothermic recrystallization transformation reaction. Subsequently the steam requirement drops again to the lower value for balancing the loss.

The curve D shows the time evolution of the condensate quantity accumulating and taken out in the autoclave. The first maximum results from the condensate amount going to the autoclave walls and the other metal parts. The difference between the steam quantity (curve C) and the condensate quantity (curve D) indicates the water quantity received in this time interval in the mold body which acts to heat the molded body and then also remains in it. After that a lower level results as seen from in curve C results according to the mass or loss balance.

In parallel with the recrystallization transformation to comparatively large calcium sulfate alpha-hemihydrate crystals and the reduction combined with it of the specific surface in the molded body, larger quantities of extract result. The extract quantity is proportional to the reduction of the specific surface. Large compact crystals with small specific surface lead to a comparatively larger extract yield. The extract delivery is then ended when the recrystallization transformation reaction ends. The extract contains water soluble salt or suspended material from the starting material. The contents of this material in the final product is lowered and according to the material carried away also an improvement in the quality of the final product is obtained.

Not only is there involvement in the recrystallization transformation reaction of the water and/or condensed steam forced into the pore spaces of the molded body eventually as a result of the fresh starting material, but also there is involvement of the crystal water of the calcium sulfate dihydrate liberated in the recrystallization transformation reaction.

The third maximum of the curve arises because the pressure in the autoclave at the end of the autoclaving process is lowered. Therefore the excess pressure formed in the molded body leads to a pressure gradient between the interior and the exterior of the molded body because of the air found in it and the steam formed by the revaporization of the water. Lowered pressure in the autoclave thereupon at least partially forces out the water located in the molded body. However, the pressure may not be lowered so far and/or so quickly that the molded body cracks or bursts. In this way one attains an additional dewatering which reduces the later drying expense. Moreover by-products or impurities dissolved or suspended are carried away. The grinding up of the manufactured alpha-hemihydrate is effected according to the provided purpose. The grain size influences both the stiffening and setting and strength development platform of the calcium sulfate alpha-hemihydrate treated with water.

Figure 6:
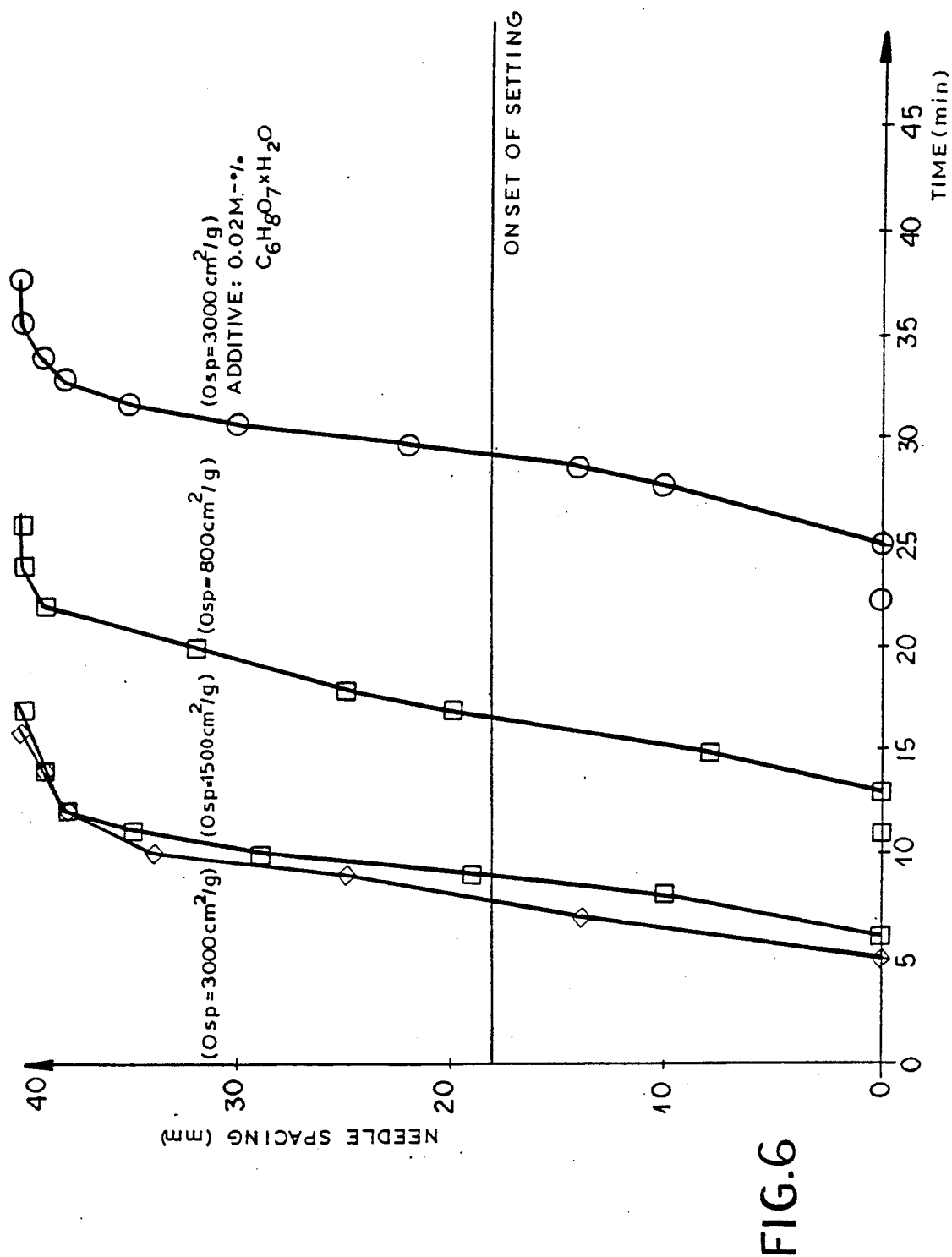
FIG. 6 is a graphical illustration showing the dependence of the compression strength of the alpha-hemihydrate suspension on the grain fineness.

In FIG. 6 the compressive strength of the calcium sulfate alpha-hemihydrate suspension is plotted as a function of time depending on the grain size. Along the ordinate are plotted the needle spacings or displacements in mm of a Vicat apparatus depending on DIN (German Industrial Standard) 1168 while on the abscissa the times in min are plotted. It is apparent that with increasing specific surface $O_{sp}$ the onset of stiffening and setting is shifted to shorter times. Thus the addition of a retardant for strengthening or setting, substantially in the form of citric acid monohydrate, is appropriate at least with calcium sulfate alpha-hemihydrate crystals with higher specific surface. Thereby the onset of strengthening of the alpha-hemihydrate with a specific surface of 3000 $cm^2/g$ is shifted by about 7 min to about 30 min when 0.02% by weight of citric acid monohydrate is added.

As seen from FIG. 7 the grain size influences the compression strength development. In FIG. 7 the compression strength in $N/mm^2$ is plotted on the ordinate and on the abscissa the time in hours is plotted. The different curves illustrate the compression strength development for the alpha-hemihydrate pastes made from alpha-hemihydrate with the indicated specific surface with the addition of 0.02% by weight citric acid monohydrate. The alpha-hemihydrate with a specific surface of 3500 and/or 4700 $cm^2/g$ is seen. The water requirement in this case amounts to about 0.28 expressed by the ratio of water/gypsum (W/G).

I claim:

1. In a process for making calcium sulfate hemihydrate suitable for a construction material from a moist finely divided gypsum obtained by flue gas desulfurization from a power plant fired by brown coal, the improvement wherein a molded body is formed by pressing said gypsum at a pressure from 0.1 to 14 $N/mm^2$, said gypsum having physically bound water in a range from about 3 to 20% by weight, said pressing being sufficient to achieve 15 to 60% pore volume and more than 5% of said pore volume containing air, said molded body being fed at ambient temperature to an autoclave and being heated in said autoclave with saturated steam, water being formed by condensation of said saturated steam and subsequently being drawn into said molded body as a condensate by capillary action of said pores, water held in said pores at least partially coming from said finely divided gypsum from which said molded body is formed, regulating crystal growth and crystal pattern of calcium sulfate hemihydrate growing from an aqueous solution phase by control of a process temperature in the range between 110° C. and 180° C. and by the pressure of the process atmosphere in said autoclave, said pressure being at or above that of saturated steam at said process temperature, after said growth at least partially forcing out said water present in said pore volume of said molded body by controlled release of said pressure in said autoclave, and said molded body being removed from said autoclave.

2. The improvement defined in claim 1 wherein said molded body is formed with 25 to 35% pore volume.

3. The improvement defined in claim 1 wherein said molded body is formed in which at least half of said pore volume is filled with air.

4. The improvement defined in claim 1 wherein said bodies are autoclaved at a process temperature above 140° C.

5. The improvement defined in claim 1 wherein said bodies are autoclaved at a temperature in the range from 120° C. to 140° C.

6. The improvement defined in claim 1 further comprising forcing an additional gas into said autoclave.

7. The improvement defined in claim 1 wherein said gypsum made by desulfurizing said flue gas is mixed with a growth influencing additive prior to making said molded body.

8. The improvement defined in claim 7 wherein finely divided pieces of brown coal or wood material mixed with the gypsum as growth influencing additive.

9. A process for making calcium sulfate hemihydrate suitable for a construction material from a moist finely divided gypsum obtained by desulfurizing flue gas from a power plant fired by brown coal in the presence of saturated steam comprising:

(a) forming a molded body by pressing with a pressure from 0.1 to 14 N/mm$^2$ in an autoclave said gypsum made by desulfurizing said flue gas, said gypsum having a content of physically bound water in a range from about 3 to 20% by weight, said pressing being sufficient to achieve a pore volume from about 15 to 60% of the total volume and more than about 5% of said pore volume contains air;

(b) feeding said molded body to an autoclave;

(c) heating said molded body in said autoclave under saturated steam at a temperature of between 110° C. and 180° C. to regulate crystal growth of said calcium sulfate hemihydrate;

(d) after said growth at least partially forcing out water present in said pore volume of said molded body by controlled release of pressure in said autoclave; and (e) removing said molded body from said autoclave.

10. A process defined in claim 9, further comprising mixing a growth influencing additive with said gypsum prior to making said molded body, said growth influencing additive selected from the group consisting of finely divided pieces of said brown coal and of wood materials.

11. A process defined in claim 9, further comprising heating with said temperature above 140° C.

* * * * *